United States Patent Office 2,934,569
Patented Apr. 26, 1960

2,934,569
PREPARATION OF PARA-FLUOROPHENOL

William E. Kuehlewind, Jr., Sanborn, N.Y., assignor to Olin Mathieson Chemical Corporation, a corporation of Virginia No Drawing. Application July 1, 1957
Serial No. 668,906

2 Claims. (Cl. 260—623)

This invention relates to a method for the preparation of para-fluorophenol from para-bromofluorobenzene.

Para-bromofluorobenzene can be obtained by the bromination of fluorobenzene as described in Berichte, 64, 1340–45 (1931). Para-fluorophenol can be converted to the useful fungicide 2,2′-dihydroxy-5,5′-difluorobiphenyl sulfide, as described hereinafter.

In the copending application of Max M. Boudakian, Serial No. 668,857, and filed of even date herewith, there is disclosed and claimed a method for the preparation of parafluorophenol by heating at a temperature within the range from 175° C. to 350° C., and preferably from 225° C. to 300° C., and in the liquid phase a mixture of para-bromofluorobenzene, water and a third ingredient which can be sodium hydroxide, calcium hydroxide, sodium carbonate, sodium bicarbonate, calcium carbonate and calcium bicarbonate. Where the third ingredient is sodium bicarbonate, the amount thereof is generally within the range from 0.5 to 8 moles, based upon the moles of para-bromofluorobenzene, and where the third ingredient used is calcium hydroxide, sodium carbonate, calcium carbonate or calcium bicarbonate the amount thereof is generally within the range from 0.25 to 4 moles, based upon the moles of para-bromofluorobenzene. The weight of the water present in the reaction mixture is from 2 to 99 times the weight of the third ingredient, for example, sodium hydroxide or calcium hydroxide. Where sodium hydroxide is employed, the reaction can be represented by the following equation:

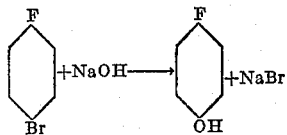

Also, where calcium hydroxide is used, the reaction can be represented by the following equation:

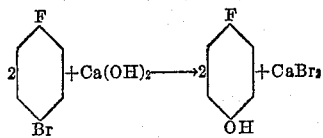

The reaction results in the production of the sodium or calcium salt of para-fluorophenol when greater than a stoichiometric quantity of base is used, and the free para-fluorophenol can be recovered from the reaction mixture by the use of conventional procedures, for example, by acidifying the reaction mixture with a mineral acid, such as nitric acid, hydrochloric acid, hydrobrominic acid, or sulfuric acid, in order to free the parafluorophenol, and thereafter distilling the reaction mixture in order to recover the product in essentially pure form.

The process described in the aforementioned Max M. Boudakian application Serial No. 668,857, although resulting in a substantial conversion of the para-bromofluorobenzene to the desired para-fluorophenol, suffers from the disadvantages that when it is carried out, there also results in certain instances an undesirable production of phenol. In accordance with the present invention, it has been found that this disadvantage of the process described in the Max M. Boudakian application, Serial No. 668,857, can be avoided by introducing into the reaction mixture a small amount of cobalt naphthenate, since when this is done, the formation of the phenol can be avoided. In addition, the introduction of the cobalt naphthenate makes possible the carrying out of the conversion of the para-bromofluorobenzene to parafluorophenol under somewhat less severe conditions of temperature and pressure for a given conversion of the para-bromofluorobenzene to the para-fluorophenol.

In carrying out the present process, the amount of cobalt naphthenate, introduced into the reaction zone can be varied widely. Generally, however, it will be within the range from 0.1 to 5 percent by weight, based upon the weight of the para-bromofluorobenzene introduced into the reaction mixture. The other conditions employed in carrying out the present process are similar to those utilized in carrying out the process of Max M. Boudakian application Serial No. 668,857. Thus, where sodium hydroxide or sodium bicarbonate is employed, the amount used will generally be within the range from 0.5 to 8 moles, based upon the moles of para-bromofluorobenzene, and calcium hydroxide, sodium carbonate, calcium carbonate or calcium bicarbonate are generally used in the amount of from 0.25 to 4 moles, based upon the moles of para-bromofluorobenzene. Likewise, the amount of water present in the reaction mixture will generally be from two times to 99 times the weight of the sodium or calcium hydroxide, carbonate or bicarbonate. The reaction temperature used will be within the range from 200° C. to 350° C. and sufficient pressure will be maintained on the reaction system to maintain a liquid phase.

The following examples illustrate various embodiments which fall within the scope of the invention, and in the examples the term "moles" signifies gram moles.

Example

This example was conducted in a pressure vessel which had a total capacity of 312 ml. and an effective capacity of 210 ml. While the reaction was being conducted, the pressure vessel or reactor was rocked in order to agitate the reactants.

0.2 mole of para-bromofluorobenzene, 0.1 mole of calcium hydroxide slurried in 9.4 moles of water and 1 percent by weight of cobalt naphthenate, based upon the weight of the para-bromofluorobenzene, were placed in the pressure vessel or reactor. The reactor was heated to 275° C. and a pressure of 990 p.s.i.g. was developed. The reactor was maintained at this temperature for 2.25 hours.

After the completion of the reaction, the reaction mixture was poured from the reactor into a beaker. The reactor was then rinsed with approximately 50 ml. of water, then with approximately 50 ml. of diethyl ether, and the washings were added to the reaction mixture. The reaction mixture and washings were then filtered through a sintered glass funnel. The filtered cake was washed with approximately 25 ml. of water and twice with approximately 25 ml. of diethyl ether, then dried in a vacuum oven at 65° C. and analyzed to determine conversion of the charged para-bromofluorobenzene. In this example, 90 percent of the para-bromofluorobenzene charged was converted. The filtrate was acidified to a pH of about 2 with concentrated aqueous hydrochloric acid and extracted three times with diethyl ether, employing approximately 25 ml. of diethyl ether for each extraction. The ether extracts were dried over magnesium sulfate, concentrated and then distilled at atmospheric pressure. The different fractions were analyzed by means of infrared. 10.2 grams of para-fluorophenol were produced, a 50 percent yield based upon the para-bromofluorobenzene converted, and no phenol and no para-bromopehnol were produced.

Para-fluorophenol can be converted to 2,2'-dihydroxy-5,5'-difluorobiphenyl sulfide in the following manner. To 124 grams of para-fluorophenol dissolved in one liter of anhydrous carbon disulfide, 102 grams of freshly prepared sulfur dichloride is added in four hours with stirring at room temperature. Hydrogen chloride gas is evolved. The mixture is heated at refluxing temperature overnight. After pouring over ice, 68 grams of pure product as orange precipitate is obtained, and the fiitrate gives a dark residue after removal of the carbon disulfide by steam. The residue upon pouring into ice gives 38 grams more of product, thus resulting in a crude yield of 106 grams or 41 percent. Recrystallization from ethylene dichloride gives white needles, and vacuum sublimation gives the pure compound 2,2'-dihydroxy-5,5'-difluorobiphenylsulfide having a melting point of 119° C.

Cotton thread impregnated with a 1000 p.p.m. solution of 2,2'-dihydroxy-5,5'-difluorobiphenyluslfide in petroleum ether is protected against fungus damage. Note PB 111592 "Chemical Investigations of Fluorine Compounds as Fungicides" published by the Office of Technical Services, U.S. Department of Commerce.

What is claimed is:

1. A method for the preparation of para-fluorophenol which comprises heating at a temperature within the range from 200° C. to 350° C. in liquid phase a mixture of para-bromofluorobenzene and a material selected from the group consisting of sodium hydroxide, calcium hydroxide, sodium carbonate, sodium bicarbonate, calcium carbonate and calcium bicarbonate while the reactants are admixed with a liquid medium consisting essentially of water in weight amount from 2 to 99 times the weight of said material and cobalt naphthenate in weight amount from 0.1 to 5 percent, based upon the weight of the para-bromofluorobenzene whereby a salt of para-fluorophenol is formed and recovering para-fluorophenol from said salt, the molar ratio of said material to para-bromofluorobenzene being within the range from 0.5 to 8 when said material is selected fromthe group consisting of sodium hydroxide and sodium bicarbonate and the molar ratio of said material to para-bromofluorobenzene being within the range from 0.25 to 4 when said material is selected from the group consisting of calcium hydroxide, sodium carbonate, calcium carbonate and calcium bicarbonate.

2. The method of claim 1 wherein said material is calcium hydroxide.

References Cited in the file of this patent
UNITED STATES PATENTS

| | | |
|---|---|---|
| 1,062,351 | Meyer et al. | May 20, 1913 |
| 1,934,565 | Britton et al. | Nov. 7, 1933 |
| 2,085,429 | Herdieckerhoff | June 29, 1937 |
| 2,126,648 | Lofton et al. | Aug. 9, 1938 |

OTHER REFERENCES

Hale et al.: Industrial and Eng. Chem., vol. 20 (1928), pp. 114–124 (11 pp.).

De Crauw: Chem. Abstracts, vol. 25 (1931) pp. 4859–4861.

UNITED STATES PATENT OFFICE
CERTIFICATE OF CORRECTION

Patent No. 2,934,569            April 26, 1960

William E. Kuehlewind, Jr.

It is hereby certified that error appears in the printed specification of the above numbered patent requiring correction and that the said Letters Patent should read as corrected below.

Column 1, lines 31 and 32, for "sodium bicarbonate" read -- sodium hydroxide or sodium bicarbonate --; column 3, line 5, for "bromopehnol" read -- bromophenol --.

Signed and sealed this 4th day of April 1961.

(SEAL)
Attest: ERNEST W. SWIDER

XXXXXXXXX
Attesting Officer

ARTHUR W. CROCKER
Acting Commissioner of Patents